(12) United States Patent
Dowe et al.

(10) Patent No.: US 6,313,937 B1
(45) Date of Patent: Nov. 6, 2001

(54) ELECTRICALLY ACTUATED MAGNETIC MICRO-SHUTTERS

(75) Inventors: David R. Dowe, Holley; Edward P. Furlani, Lancaster; Svetlana Reznik, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/449,646

(22) Filed: Nov. 30, 1999

(51) Int. Cl.$^7$ .............................. G02F 1/09; G02B 26/00; G02B 26/02; G02B 25/08
(52) U.S. Cl. .................... 359/280; 359/290; 359/291; 359/230; 359/224
(58) Field of Search .................................. 359/280, 290, 359/293, 230, 254, 224

(56) References Cited

U.S. PATENT DOCUMENTS

| | | | |
|---|---|---|---|
| 3,336,852 | 8/1967 | Levin | 95/53 |
| 3,447,862 | 6/1969 | Elpern | 350/269 |
| 3,989,357 | 11/1976 | Kalt | 350/161 |
| 4,012,828 | 3/1977 | Dahl | 29/517 |
| 4,024,552 | 5/1977 | Kondo | 354/234 |
| 4,094,590 | 6/1978 | Kalt | 350/269 |
| 4,178,077 | 12/1979 | Te Velde | 350/285 |
| 4,235,522 | 11/1980 | Simpson et al. | 350/266 |
| 4,770,538 | 9/1988 | Orkosalo | 356/429 |
| 4,880,293 | 11/1989 | Gilliland, III et al. | 350/269 |
| 4,946,256 | 8/1990 | Woodruff | 350/269 |
| 5,052,777 | 10/1991 | Ninnis et al. | 385/19 |
| 5,210,569 | 5/1993 | Harada | 354/442 |
| 5,233,459 | 8/1993 | Bozler et al. | 359/230 |
| 5,659,280 | 8/1997 | Lee et al. | 335/284 |
| 5,677,783 | * 10/1997 | Bloom | 359/224 |
| 5,681,103 | 10/1997 | Remillard et al. | 362/32 |
| 5,691,682 | 11/1997 | Jeffers et al. | 335/302 |
| 5,706,120 | 1/1998 | O'Brien et al. | 359/230 |
| 5,727,240 | 3/1998 | Mizumoto et al. | 396/210 |
| 5,737,653 | 4/1998 | Tokui | 396/319 |
| 5,742,856 | 4/1998 | Izukawa | 396/319 |
| 5,749,007 | 5/1998 | Sakurai | 396/319 |
| 5,784,189 | 7/1998 | Bozler et al. | 359/254 |
| 5,829,870 | 11/1998 | Remillard et al. | 362/510 |
| 5,852,393 | 12/1998 | Reznik et al. | 335/284 |
| 5,959,763 | * 9/1999 | Bozler | 359/290 |

* cited by examiner

*Primary Examiner*—Georgia Epps
*Assistant Examiner*—Michael A. Lucas
(74) *Attorney, Agent, or Firm*—Peyton C. Watkins

(57) ABSTRACT

A spatial light modulation device is formed by creating forming an electromagnetic field within a substrate with at least one movable element, fixedly attached to the substrate at a first end, from a soft magnetic material with an anisotropic stress created within the movable element such that the element exists in a first position as a result of the anistropic stress and an actuating device comprising a magnetic layer placed within close correspondence with the soft magnetic material for placing the soft magnetic material into a second position.

18 Claims, 4 Drawing Sheets

ELECTRICALLY ACTUATED MAGNETIC MICRO-SHUTTERS

CROSS-REFERENCE TO RELATED APPLICATIONS

The present application is related to U.S. application Ser. No. 09/451,171, filed Nov. 30, 1999, entitled "Magnetic Micro-Shutters" by David R. Dowe, et al.; and U.S. application Ser. No. 09/451,071, filed Nov. 30, 1999, entitled "One Time Use Camera Uses Magnetic Micro-Shutter As An Exposure Frame Counter" by David R. Dowe, et al.

FIELD OF THE INVENTION

The present invention relates to spatial light modulation devices and more specifically to electromagnetic spatial light modulation devices formed by placing a nickel layer upon a substrate and an electromagnet below the nickel layer.

BACKGROUND OF THE INVENTION

Micro-shutters have been used within the prior art as light spatial modulators. One of the more notable of these is U.S. Pat. No. 5,784,189 issued to Bozler et al. and assigned to Massachusetts Institute of Technology (MIT), hereinafter referred to as the Bozler '189 patent. This prior art disclosure taught making spatial light modulators using micro-shutters that were lithographically generated and electrostatically controlled. The individual micro-shutters employed aluminum and required electrostatic control. While useful as teaching a method towards fabricating a light modulation devices with small apertures, the Bozler '189 fails to teach micro-shutter fabrication techniques that are useful under magnetic control.

As shown in U.S. Pat. No. 4,012,828, a Digital Frame Counter is described where the exposures used for a camera are displayed in a digital format. Such a digital frame counter could be a Liquid Crystal Display (LCD). The advantages of this type of display are that individual numbers can be larger than the above discussed rotating wheel, and each frame number can be displayed without resorting to the used of dots as intermediate frame numbers. The disadvantages of this type of display are that LCD's are relatively expensive, require support electronics and can appear dark in low light situations due to their dependence on polarizing filters for them to function.

As seen by the foregoing discussion, it should be readily apparent that there remains a need within the art for a magnetically controlled micro-shutter that is inexpensive to fabricate.

SUMMARY OF THE INVENTION

The present invention provides a method and apparatus for an electromagnetic spatial light modulation device as formed by placing a soft magnetic layer with a nickel layer upon a substrate and creating an electromagnet below the device. The soft magnetic layer is forced to roll and unroll in response to a magnetic field created by passing an electric current through the conductive traces in the surface of the substrate. The soft magnetic layer is drawn by the electromagnetic field created when a current is introduced into the conductive traces.

This present invention provides a spatial light modulation device comprising a substrate material of one of the following: (glass, quartz, single crystal silicon, ceramic, plastic or a metal) with a series of conductive traces formed in the surface of the substrate, a plurality of photoresist layers with the corrugations being formed in the top photoresist layer away from the substrate wherein the photoresist layer forms a release layer on the substrate that can peel away from the substrate, a pair of nickel layers with a first nickel layer having a compressive stress and a second nickel layer having a tensile stress formed on the release layer. The pair of nickel layers having a thickness of about 500 Angstroms. The method for creating the apparatus envisions providing the nickel layer upon a photoresist layer, the photoresist layer being patterned to created the fixedly attached end of the segment with the remaining portion of the segment being removably attached, a highly resistive film on top of the nickel layers, an electromagnet formed below the photoresist layers as a series of opposite poles created by the series of conductive paths that wind through the substrate once the conductive paths are energized.

DETAILED DESCRIPTION OF THE INVENTION

Figure 1:
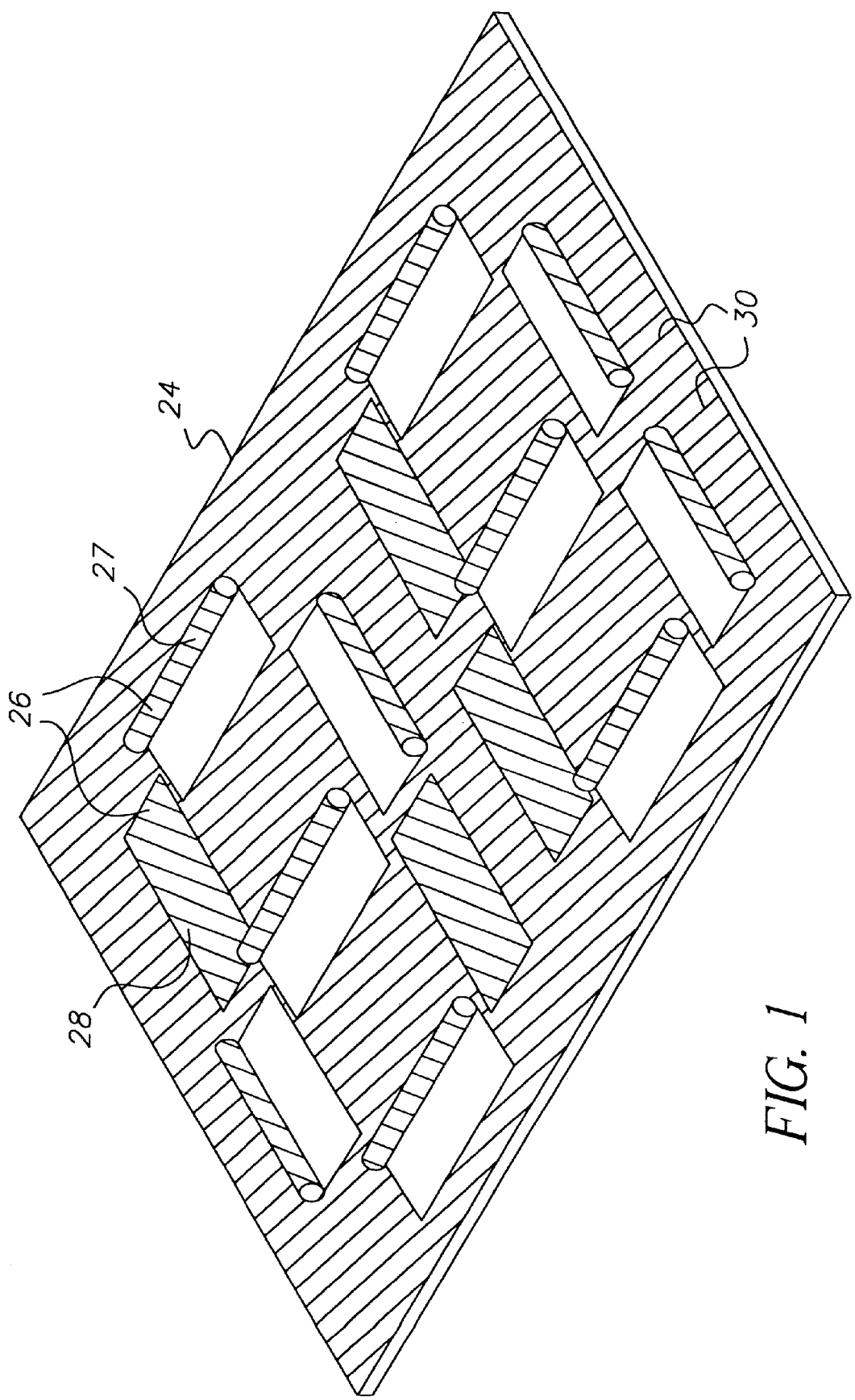
FIG. 1 is the preferred usage of the spatial light modulation device of the present invention.
Figure 2:
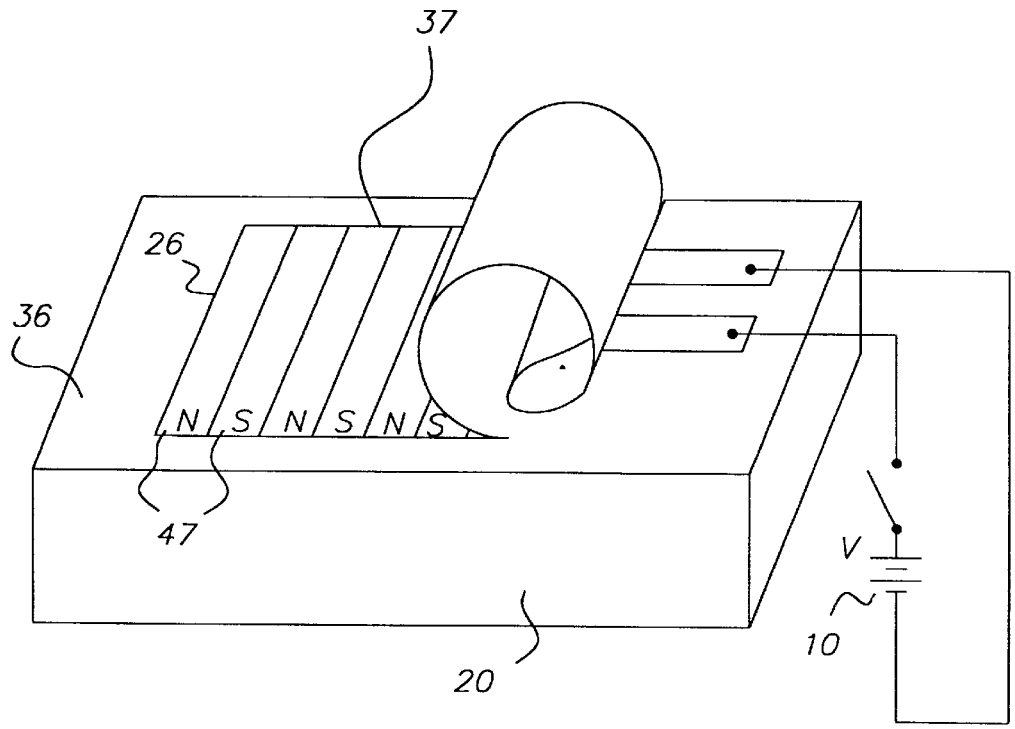
FIG. 2 is a perspective view of one segment of the present invention in a partially curled position.
Figure 3:
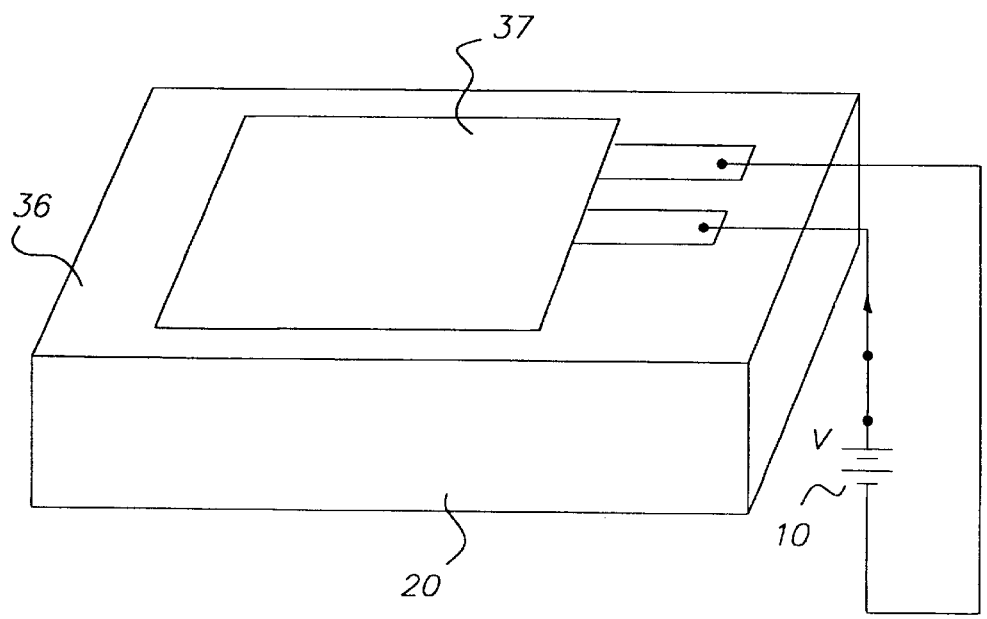
FIG. 3 is a perspective view of one segment of the present invention in an uncurled position.

The present invention relates to a method and apparatus for a magnetic micro-shutter display 24 as illustrated by the drawings and detailed in the following description. Referring to FIG. 1, is an illustration of a magnetic micro-shutter display 24, as envisioned by the present invention wherein magnetic micro-shutter segments 26 are, preferably, made from a nickel alloy. Magnetic micro-shutter segments 26 as seen in the magnetic micro-shutter display 24 are either in a rolled up state 27 or an unrolled state 28. As seen in FIG. 1, the magnetic micro-shutter segments 26 can be used to create a seven segment display. FIG. 2 illustrates the magnetic micro-shutter segment 26 in a partially curled up (rolled up) position to illustrate the alternating magnetic structure that exists beneath the magnetic micro-shutter segment 26. FIG. 3 illustrates the magnetic micro-shutter segment 26 in an unrolled state 28 (uncurled position) wherein the electromagnets seen are used to force the magnetic micro-shutter segment 26 to uncurl.

The preferred embodiment of the present invention envisions that the magnetic micro-shutter application employs a nickel alloy, or permalloy, in constructing the magnetic micro-shutter segment 26. The preferred chemical composition of this nickel alloy, or permalloy, material is Ni approximately 79%, Mo approximately 4% and the balance is Fe (approximately 17%). This preferred composition for nickel alloy, or permalloy, having this chemical composition results in magnetic properties for this material yielding a maximum permeability 100K (where the permeability is the ratio of the magnetic flux density B to the corresponding magnetic field strength H), saturation inductance of approximately 8,700 Gauss and very low coercivity (approximately 0.05 Oersteds). It is specifically envisioned that other magnetic materials with the same or close magnetic properties (for example Mu-metal) could be used in our application, however it is important that material used within the context of the present invention be sufficiently flexible such that it can easily unroll from rolled up position.

Figure 4A:
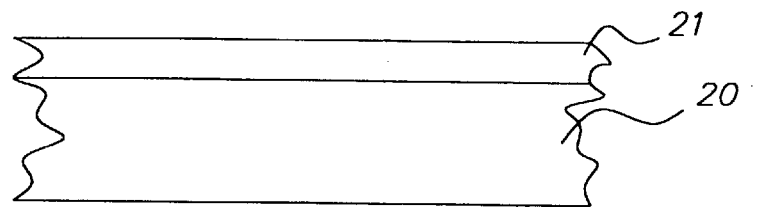
FIGS. 4a–4d illustrates the series of steps employed in creating the present invention.

The process for building the magnetic micro-shutter segment 26 of the magnetic micro-shutter display 24 is detailed below referring to FIGS. 4a–4c. This process may differ depending on the material used to form substrate 20. The preferred embodiment employs glass as the substrate 20 material because it is inexpensive and commonly available with flat smooth surfaces. Other prospective materials can also serve as substrate 20. These materials, which are considered to be equivalent materials, which may comprise: fused quartz; or in reflective mode operation, single crystal silicon; or the like. FIG. 5 illustrates an example of conductive paths 57 traversing the surface of substrate 20. These conductive paths 57 are electrically connected to a current source 10 which can supply of electrical current through conductive paths 57. The current source 10 illustrated in FIG. 5 is a voltage controlled source of current. However, current controlled sources are equally envisioned as part of the present invention.

Referring again to FIG. 4a, the substrate 20 structure is then coated with a first layer of photoresist 21 having a thickness around 3000 Å using conventional techniques. The following discussion details a process employing a positive photoresist. However, the photoresist may be a negative or positive resist. The photoresist is typically comprised of a base resin (Novolak) and a photoactive compound that allows the photoresist to be patterned using conventional techniques, leaving resist in areas where release in an overlying film is required. A resist, such as, the photoresist sold under the name "AZ 1350B" has been used with good results. The substrate structure with resist is then baked at 400 C.° for one minute in air, transforming the resist layer into a smooth hard layer. This bake process partially carbonizes the resist making it very hard and inert. The films formed on the baked resist can have the same properties as films on glass with a wide variety of materials using various deposition processes.

Figure 4B:
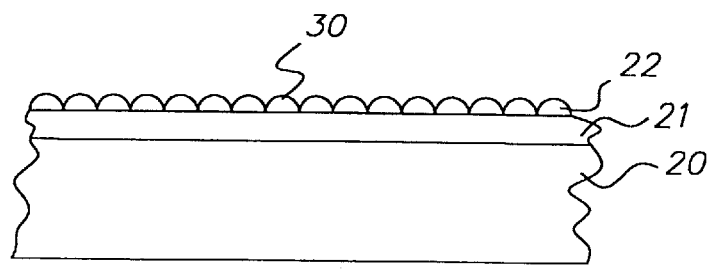
Figure 4C:
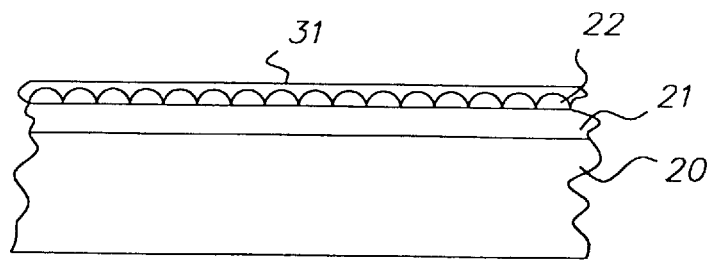
Figure 4D:
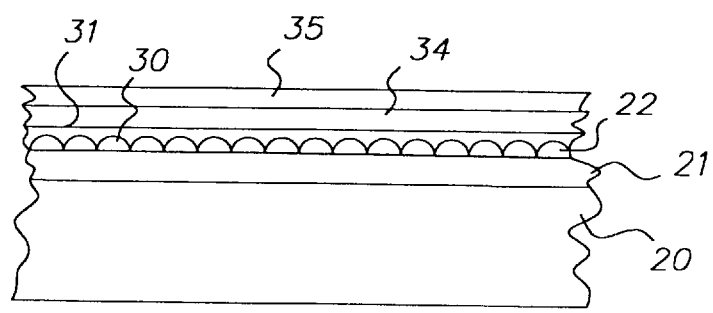
Figure 5:
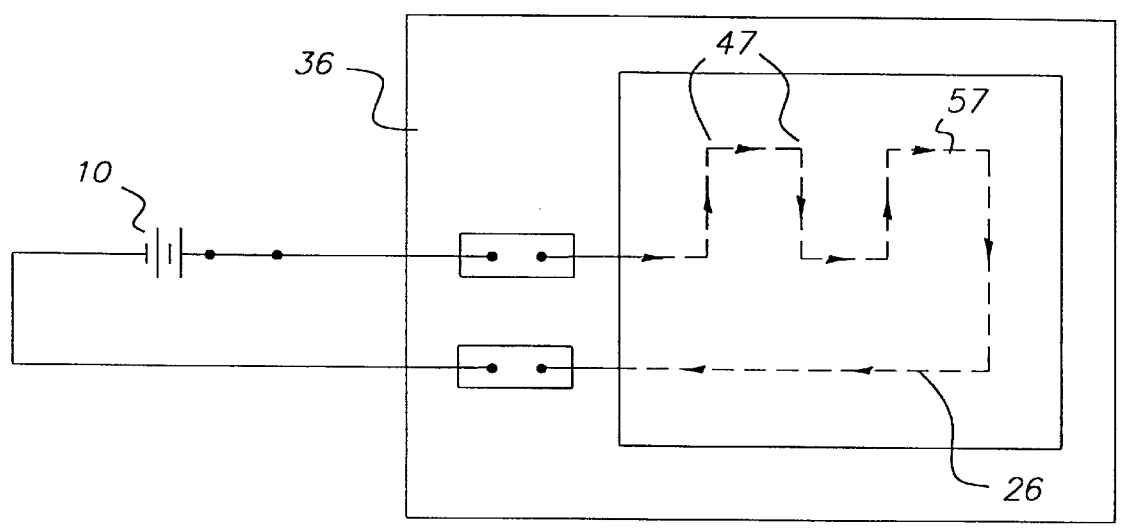
FIG. 5 illustrates the conductive paths used in the electromagnet of the present invention.

FIG. 4b illustrates the application of a second layer of photoresist 22 that is applied in a manner similar to the first layer of photoresist 21. Corrugations 30 are created in the second layer of photoresist 22. This second layer of resist 22 is preferably patterned in a 4 micron period grating of resist regions over the previously baked resist areas. The substrate structure with the two photoresist layers is then again baked at 400 C.° for one minute forming a second smooth periodic hard resist structure. This second resist layer 22 provides the corrugations 30 in an overlying layer formed in the next steps. The two resist layers provide the release layer for the overlying layer. The patterned structure is then coated with a 300 Å thick film of high resistivity material 31, such as silicon dioxide or silicon nitride. The stress of this film must be low compared with the overlying layers or have compressive stress. Since the amount of stress will affect the tightness of the coil of the micro-shutter, the level of stress must be carefully controlled. Stress control is achieved by carefully selecting appropriate deposition processes and conditions. For example, silicon dioxide deposits with a large tensile stress in an atmospheric capacitive discharge (CVD) reactor; but deposits with a smaller compressive stress using vacuum evaporation. The amount of stress will vary depending on deposition rate, temperature and pressure. The insulative film is then coated with a first nickel film 34 of sputtered nickel having compressive stress, and then a second nickel film 35 having tensile stress. Both nickel films 34, 35 preferably have a thickness of 500 Å, and a net stress which is low compared with the stress of the combined photoresist layers. Once again, the level of stress must be carefully controlled because it will affect the tightness of the coil of the rolled nickel layer. The stress in the sputtered nickel may be adjusted by changing the sputtering power and gas (argon) pressure.

Referring again to FIGS. 1–3, the photoresist is again applied and patterned to define the pixel areas. Part of the pixel area 36 overlays the release area 37 and part does not. The patterned structure is then etched using a nickel etch (nitric acid) and then introduced into a freon (CF(4)) plasma which etches through the silicon dioxide layer. The plasma will also etch about 100 Å into the underlying photoresist layers or in the thicker silicon dioxide layer. The structure is then exposed to atomic oxygen at 300 C.° in a down stream asher. In several minutes the oxygen removes the release layers and the movable electrode coils up. The structure after coiling is shown in rolled up states 27 in FIG. 1. Coiling occurs because the bottom silicon dioxide has low stress, the first nickel layer 34 has compressive stress and the second nickel layer 35 has tensile stress. The structure is now ready for packaging in a hermetic package.

In the preferred embodiment, corrugations are provided to enhance the lateral stiffness to keep the film from curling perpendicular to the intended roll direction. The periodicity and depth of the corrugations are important parameters in the fabrication of the display structure. There may be advantages in making the corrugations very deep. Deeper corrugations make the film more flexible and this would allow the use of thicker stiffer materials to be used in the film. A thicker film may be stronger. Another advantage of deeper corrugations would be lower reflectivity of incident light. Light passing to the bottom of a corrugation has a low probability of being reflected back out, especially if the material in the film is somewhat light absorbing.

Instead of using corrugations for anisotropic stiffening, a deposition process, such as evaporation or ion bombardment at an angle, may be used to induce anisotropic stress.

Note that in the process just described, the size of the coil, the magnetism required to roll it out, and the response time are important parameters in the design of particular devices. Assuming other parameters are held constant, some general rules can be given for these parameters. The larger the roll, the less magnetism required to unroll the coil. The thicker the release layer, the higher the magnetism required to roll out the film. The thicker the insulating layers, the higher the roll out magnetism. The higher the differential stress in the two layers, the smaller the coil. The smaller the coil, the faster the roll up response. The roll out response time decreases as the roll out magnetism increases.

Use of light weight or less dense moveable electrode material results in faster response. For example, use of graphite and diamond or diamond-like films instead of silicon dioxide would produce a much faster opening and closing of the valve.

It is also possible to build the shutter so that the insulation film over the release layer is compressive and the metal film over the insulation film is tensile. When released this double layer will function in a way similar to the structures mode using two oppositely stressed nickel films. An example would be compressive silicon dioxide and tensile nickel.

Note also that deposited films generally have internal stress which will vary in direction and magnitude depending on deposition conditions. Some films have uniform stress, some films have stress which varies through film. By choosing the materials and deposition processes, one can generate structures where the first part of the film down is compressive and as deposition continues the stress gradually becomes tensile so that upon release, the film rolls up. Also, one can form a single film in which the stress in the lower part is compressive and in the top part is tensile.

Referring now to FIG. 2 in conjunction with FIGS. 3 and 5, the present invention is illustrated within the context of creating the magnetic fields that draw the nickel within release area 37 towards the opposite poles 47 on the electromagnet below the device. The actuation is by a magnetic field that is created by passing an electric current through the conductive paths 57 to force the nickel within release area 37 to unroll towards the one end that is not fixedly attached to the substrate. The conductive paths 57 illustrated in FIG. 5 are spaced within the substrate such that the alternating opposite currents that flow within the conductive paths are spaced according to the opposite poles 47 as shown in FIG. 2. According to the left hand rule of electromagnetic theory, opposite magnetic fields will be created from opposite flowing currents. Within the preferred embodiment, it is envisioned that the conductive paths 57 are spaced such that they will traverse the surface of the substrate creating alternating magnetic fields. The result is an electrical to mechanical energy conversion with the conversion of electrical current to rotational force (resulting in a displacement) within the micro-shutters. Other examples of existing applications of electrical to mechanical conversion are various kinds of micromotors and linear micromotors.

The foregoing description has illustrated the embodiments most preferred by the inventors. Obvious variations will be readily apparent to those skilled in the art, therefore, the breadth of the invention should be measured by the appended claims.

Parts List 10 current source
20 substrate
21 first layer of photoresist
22 second layer of photoresist
24 magnetic micro-shutter display
26 magnetic micro-shutter segment
27 magnetic micro-shutter segment in a rolled up state
28 magnetic micro-shutter segment in an unrolled state
30 corrugations
31 high resistivity material
34 first nickel film
35 second nickel film
36 pixel area
37 release area
47 opposite poles
57 conductive paths

What is claimed is:

1. A spatial light modulation device comprising:
   a substrate material having a top surface with a series of conductive traces near the top surface;
   at lest one movable element comprising a soft magnetic material and formed with an anisotropic stress in a predetermined direction being formed on the top surface, the movable element being fixedly attached to the substrate at a first end such that the element exists in a first position as a result of the anisotropic stress; and
   a current source electrically connected to the conductive traces to induce a magnetic field which forces the soft magnetic material into a second position by magnetic attraction.

2. The spatial light modulation device of claim 1 wherein the substrate material is comprised of one of the following: (glass, quartz, single crystal silicon, ceramic, plastic or a metal).

3. The spatial light modulation device of claim 1 wherein the soft magnetic material further comprises at least one nickel layer.

4. The invention of claim 1 wherein the conductive traces repeatedly traverse the top surface.

5. The spatial light modulation device of claim 1 further comprising:
   at least one photoresist layer formed between the soft magnetic material and the substrate, the photoresist having a series of corrugations formed within the photoresist.

6. The spatial light modulation device of claim 5 wherein the photoresist layer forms a release layer on the substrate that can peel away from the substrate.

7. The spatial light modulation device of claim 1 wherein the movable element is coiled by the anisotropic stress in a roll s in the predetermined direction.

8. The spatial light modulation device of claim 1 wherein the movable element further comprises a film having a tensile stress on the substrate side of the movable element and a compressive stress on the movable element side opposite the substrate interface.

9. The spatial light modulation device of claim 1 wherein the movable element unrolls away from the fixedly attached end when the means for a actuating the soft magnetic material places the element into the second position.

10. A method for creating a spatial light modulation device comprising the steps of:
    (a) providing a substrate material with a top surface having at least one movable element comprising a soft magnetic material, the movable element being formed with an anisotropic stress in a predetermined direction, the movable element being fixedly attached to the substrate at a first end such that the element exists in a first position as a result of the anisotropic stress, and a series of conductive traces formed near the top surface of the substrate; and
    (b) providing a current source electrically connected to the conductive traces to induce a magnetic field which forces the soft magnetic material into a second position.

11. The method of claim 10 wherein the step (a) of providing further comprises providing the movable element with a nickel layer.

12. The method of claim 10 wherein the providing step (a) further comprises providing the nickel layer upon a photoresist layer, the photoresist layer being patterned to create the fixedly attached end of the segment with the remaining portion of the segment being removably attached.

13. The method of claim 10 wherein the providing step (a) further comprises a first and a second photoresist layers with the second photoresist layer having a series of corrugations formed therein.

14. The method of claim 10 wherein the providing step (a) further comprises providing the movable element such that the movable element curls towards the fixedly attached end as a result of the anisotropic stress.

15. The method of claim 10 wherein the providing step (a) further comprises providing the movable element with a pair of nickel layers with a first nickel layer formed on the substrate side of the movable element having a compressive stress and a second nickel layer on the movable element side opposite the substrate having a tensile stress.

16. The method of claim 15 wherein the providing step (a) further comprises providing the pair of nickel layers having a thickness of about 500 Angstroms.

17. The method of claim 10 wherein the step (a) of providing the soft magnetic material further comprises providing the soft magnetic material within the movable substrate by one of the following techniques (sputtering, vacuum deposition, inlay, or chemical vapor deposition).

18. The method of claim 10 wherein the providing step (a) further comprises providing the series of conductive traces such that they repeatedly traverse the top surface of the substrate.

* * * * *